(12) United States Patent
Prior et al.

(10) Patent No.: US 8,341,951 B2
(45) Date of Patent: Jan. 1, 2013

(54) VEHICLE EXHAUST HEAT RECOVERY WITH MULTIPLE COOLANT HEATING MODES AND METHOD OF MANAGING EXHAUST HEAT RECOVERY

(75) Inventors: Gregory P. Prior, Birmingham, MI (US); Daniel B. Glassford, Dryden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 514 days.

(21) Appl. No.: 12/612,134

(22) Filed: Nov. 4, 2009

(65) Prior Publication Data

US 2011/0099989 A1    May 5, 2011

(51) Int. Cl.
*F01N 3/00* (2006.01)
*F01N 3/02* (2006.01)
*F01N 5/02* (2006.01)
*F01N 1/00* (2006.01)

(52) U.S. Cl. ............... 60/320; 60/287; 60/288; 60/298; 60/324

(58) Field of Classification Search .............. 60/274, 60/286, 287, 288, 298, 320, 324
See application file for complete search history.

(56) References Cited

U.S. PATENT DOCUMENTS

| | | | | |
|---|---|---|---|---|
| 6,141,961 A * | 11/2000 | Rinckel | ............. | 60/288 |
| 6,330,910 B1 * | 12/2001 | Bennett | ............. | 165/297 |
| 7,198,037 B2 * | 4/2007 | Sayers et al. | ............. | 123/568.12 |
| 2005/0044845 A1 * | 3/2005 | Onodera et al. | ............. | 60/286 |
| 2008/0223317 A1 | 9/2008 | Shintani et al. | | |

FOREIGN PATENT DOCUMENTS

| | | |
|---|---|---|
| DE | 69912335 T2 | 7/2004 |
| EP | 0058842 A1 | 9/1982 |
| FR | 2933734 A1 | 1/2010 |

\* cited by examiner

*Primary Examiner* — Thomas Denion
*Assistant Examiner* — Audrey K Bradley
(74) *Attorney, Agent, or Firm* — Quinn Law Group, PLLC

(57) ABSTRACT

An apparatus is provided for a vehicle with an engine that includes an exhaust system through which exhaust gas is discharged from the engine. A heat exchanger is positioned at least partially within the exhaust system. Coolant flow passages are provided in thermal communication with the engine and with the heat exchanger. A bypass valve is operable in a first mode to direct the exhaust gas across the heat exchanger along a first flow path to transfer exhaust heat to the coolant flow passages, and is further operable in a second mode to direct at least a portion of the exhaust gas across the heat exchanger along a second flow path to transfer exhaust heat to the coolant flow passages in a second coolant heating mode. The second flow path is restricted relative to the first flow path. A method of managing exhaust heat recovery is also provided.

9 Claims, 6 Drawing Sheets

VEHICLE EXHAUST HEAT RECOVERY WITH MULTIPLE COOLANT HEATING MODES AND METHOD OF MANAGING EXHAUST HEAT RECOVERY

TECHNICAL FIELD

The invention relates to an exhaust heat recovery for a vehicle.

BACKGROUND OF THE INVENTION

Rapid warm-up of engine coolant, engine oil, and transmission fluid is important to fuel economy during a cold start (i.e., when the vehicle has not been running and the engine and transmission are relatively cold). Engine warm-up is especially challenging for diesel and hybrid applications, as less fuel is burned.

SUMMARY OF THE INVENTION

In known exhaust heat recovery systems, coolant heating is stopped when coolant temperature reaches a predetermined temperature (i.e., a mode switch temperature), typically slightly below the temperature at which an engine thermostat opens to cool the engine via the radiator. The coolant heating is typically stopped by moving a bypass valve into a bypass mode in which exhaust flow bypasses the heat exchanger and substantially no coolant heating occurs. An apparatus is provided herein that allows exhaust heat recovery to continue after this typical mode switch temperature is reached without the risk of boiling the coolant. Thus, additional exhaust heat recovery is achieved when engine coolant heating is desirable for improved vehicle efficiency and fuel economy, such as during winter and light load driving.

Specifically, an apparatus is provided for a vehicle with an engine that includes an exhaust system through which exhaust gas is discharged from the engine. A heat exchanger is positioned at least partially within the exhaust system. Coolant flow passages are provided in thermal communication with the engine and with the heat exchanger. A bypass valve is operable in a first mode to direct the exhaust gas across the heat exchanger along a first flow path to transfer exhaust heat to the coolant flow passages in a first coolant heating mode. The valve is further operable in a second mode to direct at least a portion of the exhaust gas across the heat exchanger along a second flow path to transfer exhaust heat to the coolant flow passages in a second coolant heating mode. The second flow path is restricted relative to the first flow path, either by limiting flow to only a portion of the heat exchanger or limiting flow across the heat exchanger to only a portion of the exhaust flow from the engine. Thus, coolant temperature rise across the heat exchanger is reduced relative to the first flow path of the first coolant heating mode.

The valve is also operable in a third mode in which the exhaust gas bypasses the heat exchanger in a bypass mode during which no significant coolant heating occurs via the heat exchanger. Preferably, various sensors are positioned in the exhaust system and in the engine, and are operatively connected to the controller. The controller estimates coolant temperature rise across the heat exchanger based on the sensed vehicle operating conditions and according to a stored algorithm and controls movement of the bypass valve accordingly.

A method of managing exhaust heat recovery on a vehicle with such an apparatus includes monitoring vehicle operating conditions including engine coolant temperature, engine load, engine speed and air/fuel ratio. Exhaust temperature and exhaust flow rate across the heat exchanger are then predicted based on the monitored vehicle operating conditions. Increased coolant temperature due to exhaust flow at the predicted exhaust temperature and flow rate across the heat exchanger is then estimated. The bypass valve is then controlled to vary exhaust flow past the heat exchanger based on the estimated increased coolant temperature. The valve is controlled to establish at least two different coolant heating modes in which exhaust flows across the heat exchanger via different flow paths, and to establish a bypass mode in which substantially no exhaust flows across the heat exchanger. Thus, the method accomplishes additional heat extraction by implementing multiple coolant heating modes, but ensures that coolant exiting the heat exchanger does not boil.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
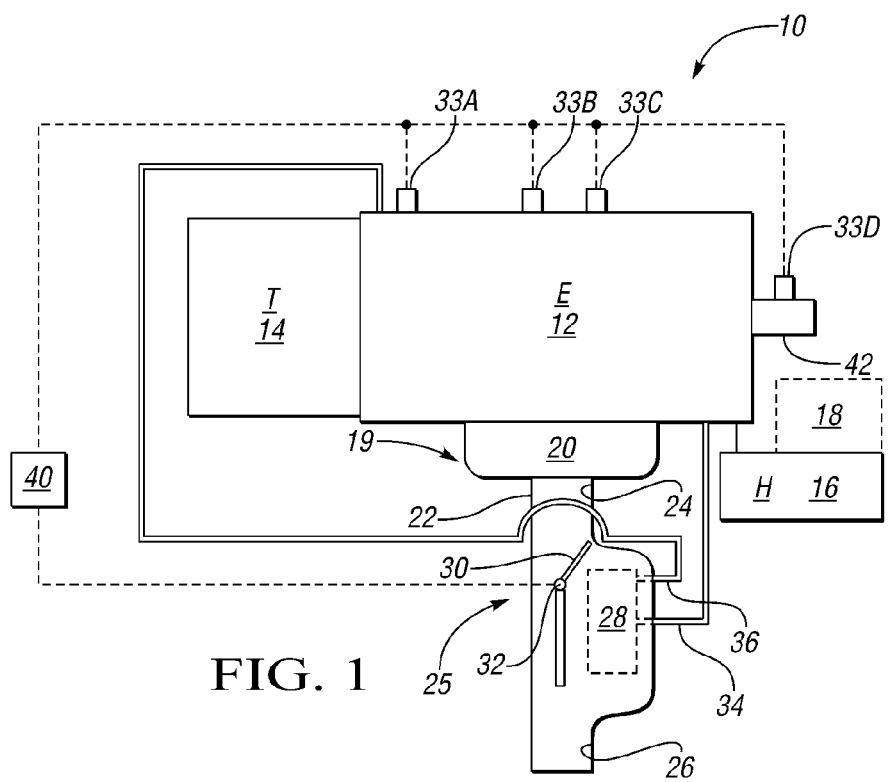
FIG. 1 is a schematic illustration of a first embodiment of a vehicle with a first embodiment of an apparatus for exhaust heat recovery having multiple coolant heating modes.

Referring to the drawings, wherein like reference numbers refer to like components throughout the several views, FIG. 1 shows a vehicle 10 that has an engine 12 (labeled E) for propelling the vehicle 10, a transmission 14 (labeled T) operatively connected to the engine 12, and a passenger compartment heater 16 (labeled H) for heating a passenger compartment, indicated in phantom as 18.

The engine 10 is an internal combustion engine of the gasoline or diesel type, and generates exhaust gas in an exhaust system 19 that includes an exhaust manifold 20 and an exhaust pipe 22 extending therefrom. The exhaust gas, which is relatively hot, exits the manifold 20 via an inlet 24 of the exhaust pipe 22. An exhaust heat recovery apparatus 25 is provided in order to selectively capture some of the exhaust heat for providing heat to the engine 12. A catalytic converter (not shown) may also be positioned in the exhaust system 18 between the manifold 20 and the apparatus 14. Recovered exhaust heat may also be provided to the transmission 14 and the heater 16 if appropriate valves and coolant flow conduits are provided to direct the coolant through the transmission 14 and the heater 16 under appropriate conditions. The exhaust heat recovery apparatus 25 includes an exhaust heat recovery device heat exchanger (EHRDHE) 28 positioned in the exhaust system 19, a valve 30, and an exhaust bypass actuator 32 controllable to selectively open the valve 30 to permit some of the exhaust gas in the exhaust pipe 22 to flow through the EHRDHE 28 to an outlet 26 of the exhaust pipe 22. Coolant flows across the EHRDHE 28 via coolant flow passages including an inlet flow passage 34 and an outlet flow passage 36. The inlet flow passage 34 carries coolant from the engine 12 to the EHRDHE 28. The outlet flow passage 36 carries the coolant from the EHRDHE 28 to the engine 12. The flow passages may be conduits or flexible or rigid tubing, or may be bored, drilled, cast or otherwise formed passages in any vehicle component.

The apparatus 25 is operable in multiple modes, depending on the position (i.e., the mode) of the valve 30. As further described with respect to FIG. 4, when the valve 30 is not open, the exhaust gas bypasses the EHRDHE 28, flowing from exhaust pipe 22 to exit the vehicle 10, without adding any heat to the EHRDHE 28. Two coolant heating modes are also provided, as described with respect to FIGS. 2A and 3. An electronic controller 40 is operatively connected to the actuator 32, and controls the actuator 32 according to vehicle operating conditions received as input signals from various sensors placed on the vehicle 10. For example, an engine coolant temperature sensor 33A is positioned to sense coolant temperature flowing into the engine 12. Engine load sensor 33B is positioned to sense engine loading. The engine load sensor 33B may be a sensor that senses manifold absolute pressure or an airflow sensor that measures the mass airflow into the engine 12 as calculated by the amount of current required to heat a wire to a predetermined temperature. These sensed conditions are correlated with engine load by the controller 40. An air/fuel ratio sensor 33C is used to measure the ratio of air to fuel, which affects the expected exhaust temperature. An engine speed sensor 33D is also operatively connected to the controller 34. In this embodiment, at least a portion of the engine speed sensor 33D is placed on the crankshaft 42, and may be a Hall-effect or other type of sensor.

Information received by the controller 40 is indicative of such operating conditions as temperature of coolant flowing through the engine 12 (indicated by engine coolant temperature sensor 33A) and engine loading (indicated by engine load sensor 33D). The sensors 33A, 33B, 33C, 33D may directly measure the operating conditions, or may provide information used in a predictive model that predicts or estimates these operating conditions. A person of ordinary skill in the art would readily understand the various ways to provide such information indicative of vehicle operating conditions to the controller 40, and would readily understand various algorithms that may be stored on the controller 40 to process the information.

Figure 2A:
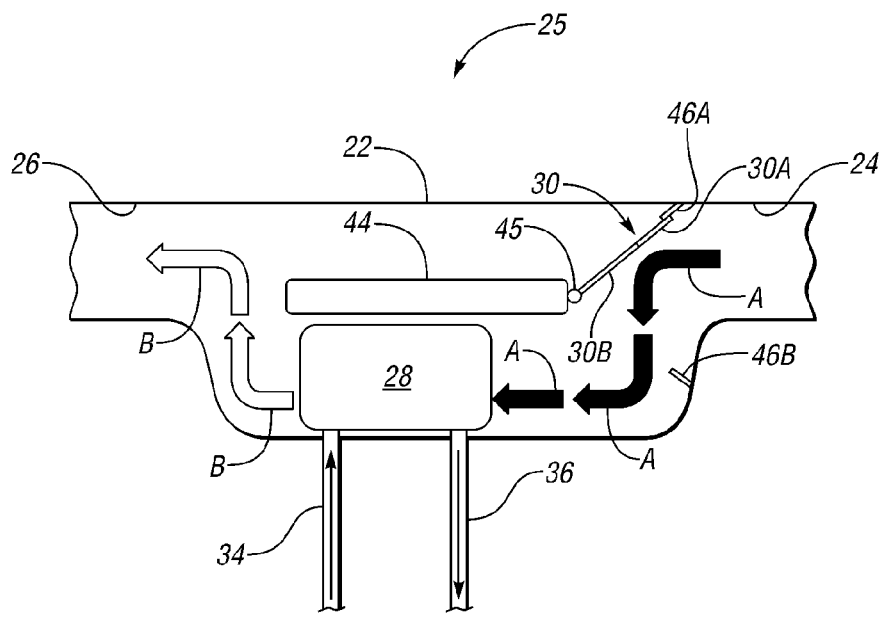
FIG. 2A is a schematic illustration of the apparatus of FIG. 1 in a first coolant heating mode.

Referring to FIG. 2A, the apparatus 25 includes a wall 44 partially dividing the exhaust pipe 22. The bypass valve 30 is pivotally connected to the wall 44 at a pivot element or hinge 45 with a pivot axis through the hinge 45. The exhaust bypass actuator 32 of FIG. 1 (not shown in FIG. 2A, but above the plane of FIG. 2A) is controllable to selectively move the valve 30 to establish the first coolant heating mode shown in FIG. 2A, the second coolant heating mode shown in FIG. 3, and the bypass mode shown in FIG. 4. Stops 46A, 46B extend within the exhaust pipe 22 to define the range of motion of the valve 30.

Figure 2B:
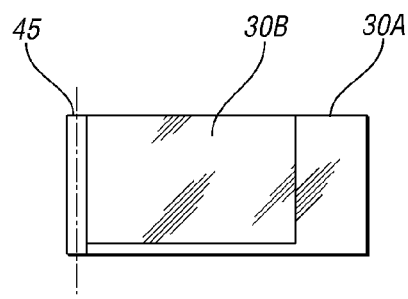
FIG. 2B is a schematic side view illustration of the valve of FIG. 2A.

The valve 30 includes a first portion 30A and a second portion 30B. The portions 30A, 30B are independently pivotable about the hinge 45. Second portion 30B fits within an opening of first portion 30A as shown in FIG. 2B. When both of the portions are in the same rotational position with respect to the hinge 45 they extend from the pivot axis to stop 46A, stop 46B, or a rotational position therebetween.

Referring to FIG. 2A, when the valve 30 is in the first mode, both of the portions 30A, 30B are in a first position, blocking flow on one side of the wall 44, and therefore directing exhaust flow through the heat exchanger 28 along a first flow path in a first coolant heating mode, as indicated by flow arrows A showing exhaust gas entering the heat exchanger 28, and flow arrows B indicating exhaust gas exiting the heat exchanger 28. Some heat is transferred from the exhaust gas to the engine coolant via the heat exchanger 16, so that coolant in flow passage 36 is warmer than coolant in flow passage 34.

Figure 3:
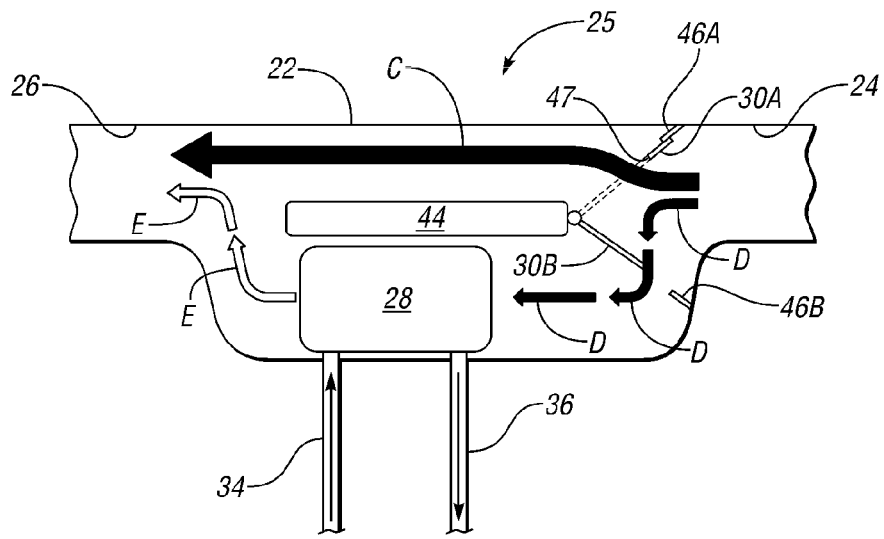
FIG. 3 is a schematic illustration of the apparatus of FIGS. 1-2B in a second coolant heating mode.

Referring to FIG. 1, the controller 40 predicts an exhaust temperature and flow rate based on information from the engine loading sensor 33B, air/fuel ratio sensor 33C and engine speed sensor 33D, and estimates an increased coolant temperature across the heat exchanger 28 due to exhaust flow at the predicted temperature and rate. When the engine 12 is sufficiently warmed so that the coolant temperature sensor 33A indicates that coolant flowing through the engine 12 is above a first predetermined temperature, and the estimated increased temperature is less than a second predetermined temperature, then continued engine heating will occur by controlling the valve 30 to operate in a second mode, as shown in FIG. 3, in which the second valve portion 30B is moved to a second position shown in FIG. 3. The goal of the second coolant heating mode is to continue to extract heat from the exhaust after the first coolant heating mode but to prevent boiling of the coolant exiting the heat exchanger. In the second mode, the flow path indicated by arrows A in FIG. 2A is partially blocked. The majority of exhaust gas flow is directed along an opposite side of wall 44 from the heat exchanger 28 than when the valve 30 is in the first position, as indicated by flow arrow C. Because second portion 30B is moved to the second position, an opening or window 47 is formed between the hinge 45 and the first valve portion 30A. The majority of the exhaust gas passes through the window 47 and out of the exhaust gas outlet 26, as indicated by flow arrow C. A small portion of the exhaust gas flows through the heat exchanger 28, as indicated by arrows D indicating exhaust flow into the heat exchanger 28, and arrows E indicating exhaust flow out of the heat exchanger 28, the exhaust flowing across the heat exchanger being cooled so that exhaust at flow arrows D is warmer than exhaust at flow arrows E. The arrows D, E and C represent the second flow path of the second coolant heating mode. Some heat is extracted from the exhaust gas and transferred to the engine coolant in flow passage 36; however, warming of the coolant is at a lower rate in comparison to the first coolant heating mode, because only a portion of the exhaust gas is routed through the heat exchanger 28 in the second coolant heating mode. This is done to allow additional exhaust heat recovery without resulting in boiling of the coolant exiting the heat exchanger 28.

Figure 4:
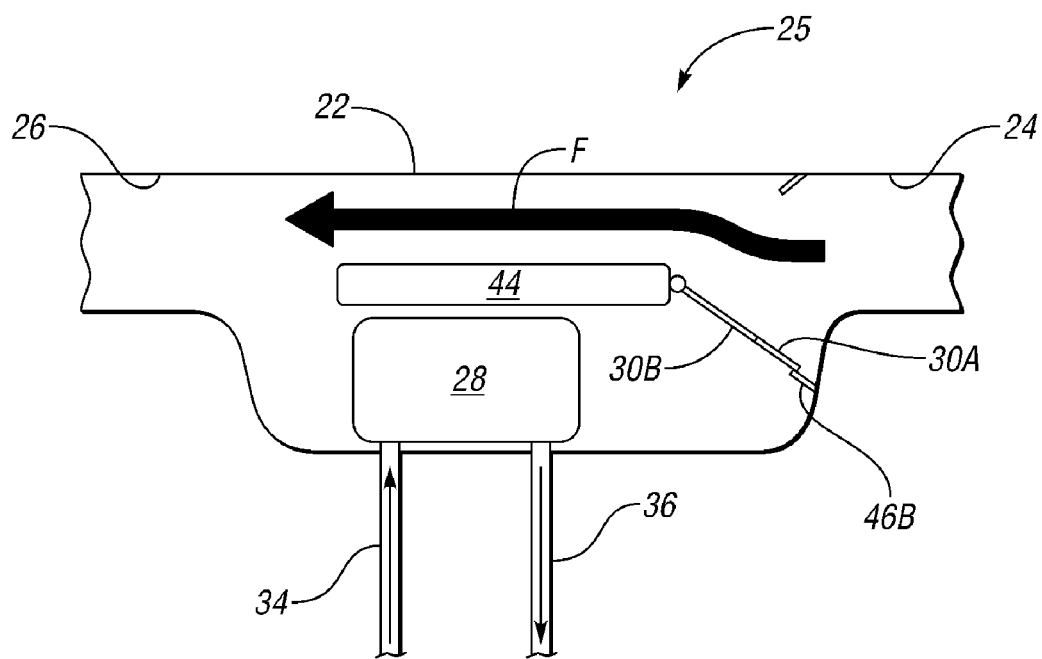
FIG. 4 is a schematic illustration of the apparatus of FIGS. 1-3 in a heat exchanger bypass mode.

Referring to FIG. 4, when the coolant temperature sensor 33A indicates that the temperature of coolant flowing through the engine 12 is greater than a second predetermined temperature, or when the estimated increased coolant temperature based on information from the sensors 33A, 33B, 33C, 33D is greater than the second predetermined temperature, then the controller 40 moves the first valve portion 30A to align with the second valve portion 30B at the stop 46B. Thus, all exhaust flow is directed on the opposite side of wall 44 from the heat exchanger 28 along a third flow path, as indicated by flow arrow F, bypassing the heat exchanger 28 in a bypass mode.

Figure 5:
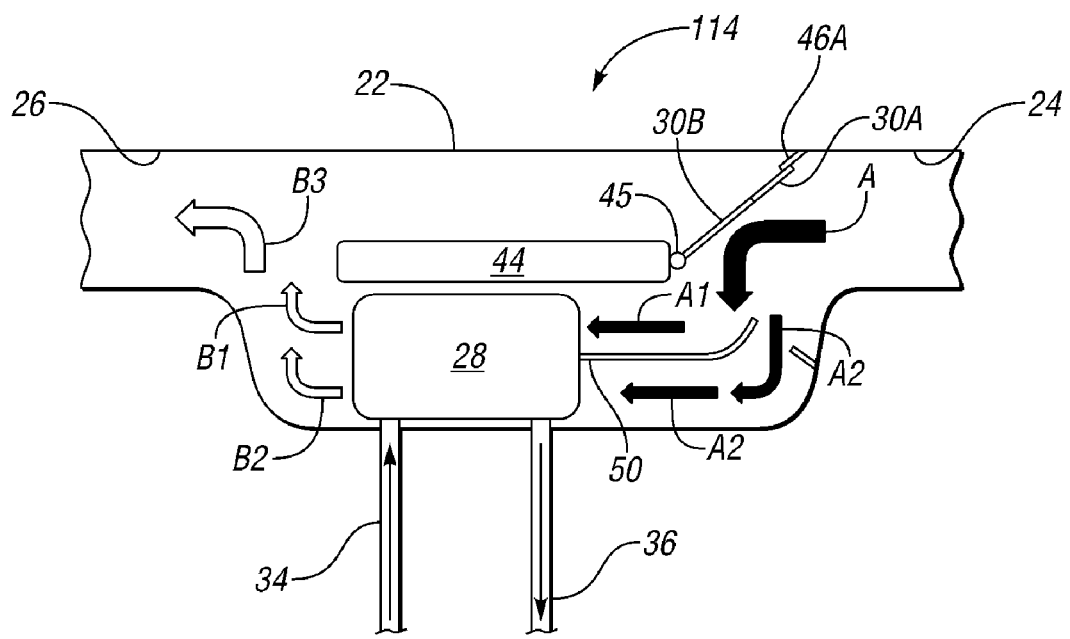
FIG. 5 is a schematic illustration of an alternative embodiment of an apparatus for exhaust heat recovery having multiple coolant heating modes for use with the vehicle of FIG. 1 and in a first coolant heating mode.
Figure 6:
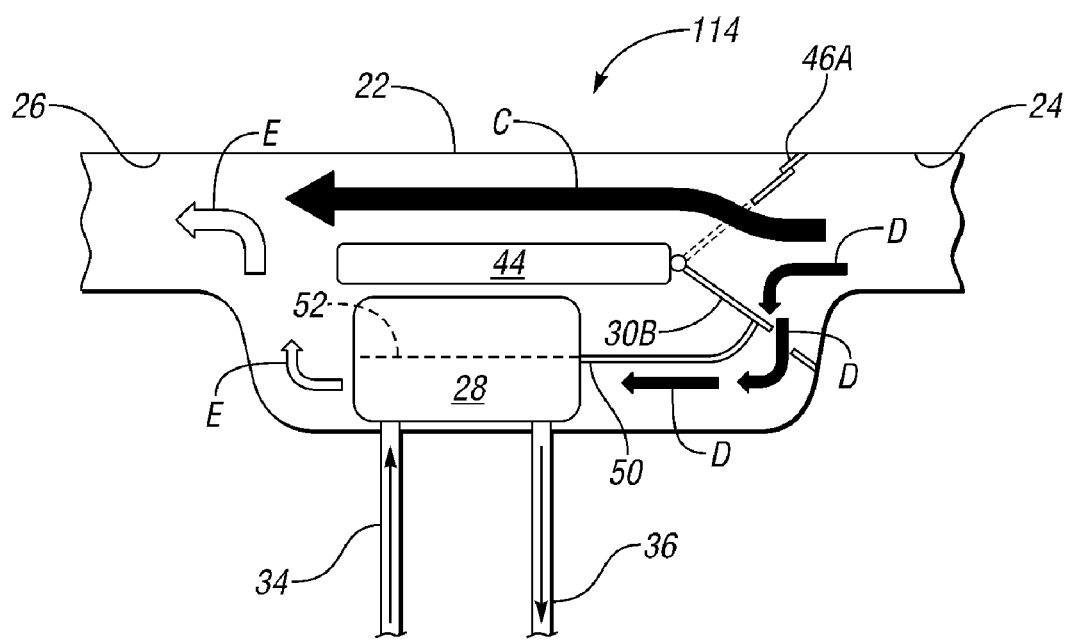
FIG. 6 is a schematic illustration of the apparatus of FIG. 5 in a second coolant heating mode.
Figure 7:
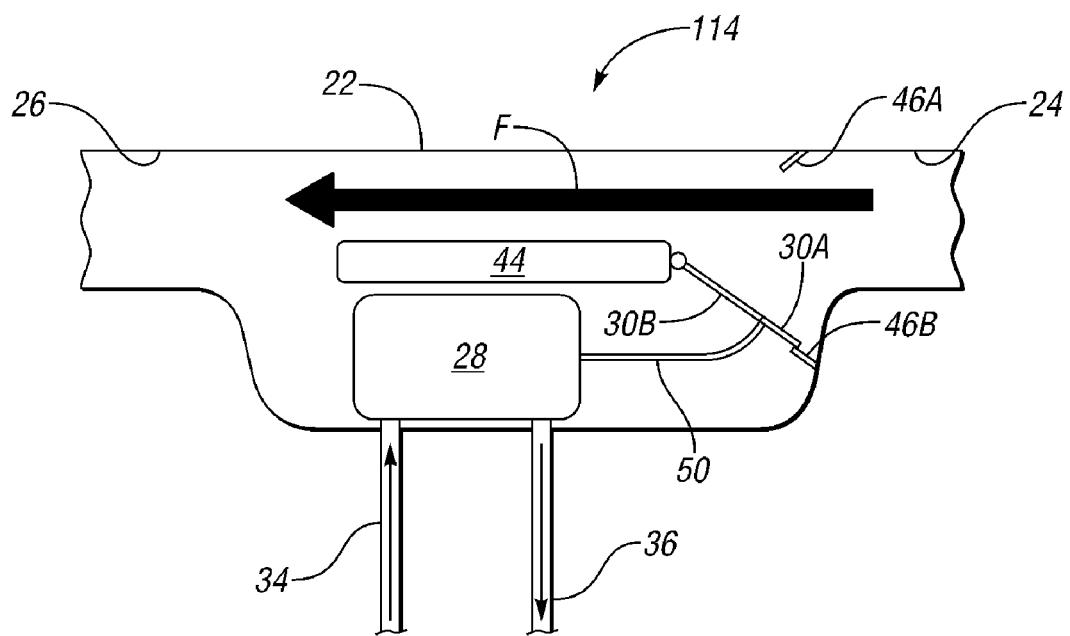
FIG. 7 is a schematic illustration of the apparatus of FIGS. 5 and 6 in a bypass mode.

Referring to FIGS. 5-7, as an alternative to apparatus 14, another embodiment of an apparatus 114 operatively connectable to the engine 12 is operable to accomplish exhaust heat recovery with multiple coolant heating modes. Components of the apparatus 114 that are the same as those of apparatus 14 are referred to using like reference numbers. The apparatus 114 includes a barrier 50 extending between the heat exchanger 28 toward the exhaust pipe inlet 24. The barrier 50 separates exhaust flow from the inlet 24 to the heat exchanger 28. When the valve 30 is in the first mode to establish the first coolant heating mode of FIG. 5, the barrier 50 has little effect on coolant heating, as all exhaust flow is directed across the heat exchanger 28 as indicated by inlet flow represented by flow arrow A, which is split into two flow paths across the heat exchanger 28, indicated by flow arrows A1 and A2 and flows across the heat exchanger 28, exiting as indicated by flow arrows B1, B2 and B3.

When the valve 30 is controlled to establish the second coolant heating mode as described with respect to FIG. 3, the second valve portion 30B extends to the barrier 50 to partially block exhaust flow to the heat exchanger 28, as shown in FIG. 6. Thus, only a portion of the exhaust flows across the heat exchanger 28, as indicated by flow arrows D. Because the barrier 50 directs the flow to a portion of the heat exchanger 28 (i.e., the portion appearing below line 52 in FIG. 6, with line 52 being aligned with the barrier 50), only that portion of the heat exchanger 28 is used for extracting heat from the exhaust. The remainder of inlet exhaust flow is directed on the opposite side of the wall 44, bypassing the heat exchanger 28, as indicated by flow arrow C.

When the valve 30 is controlled to establish the bypass mode as described with respect to FIG. 4, all flow past the heat exchanger 28 is blocked as shown in FIG. 7, and the inlet exhaust flow bypasses the heat exchanger 28 as indicated by flow arrow F.

Figure 8:
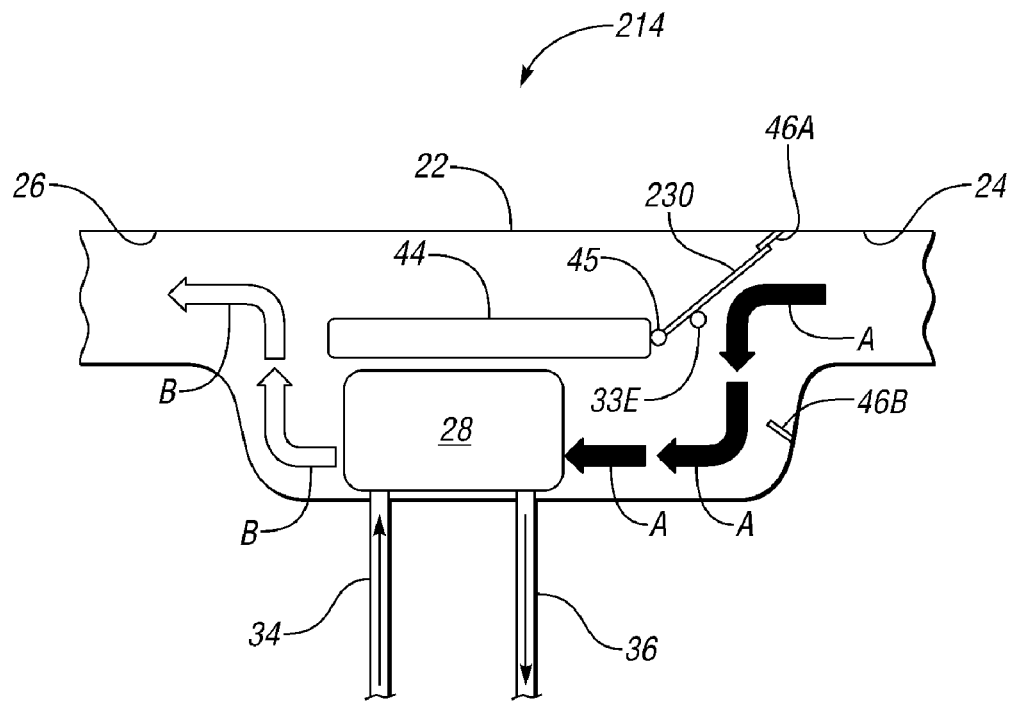
FIG. 8 is a schematic illustration of an alternative embodiment of an apparatus for exhaust heat recovery having multiple coolant heating modes for use with the vehicle of FIG. 1 and in a first coolant heating mode.
Figure 9:
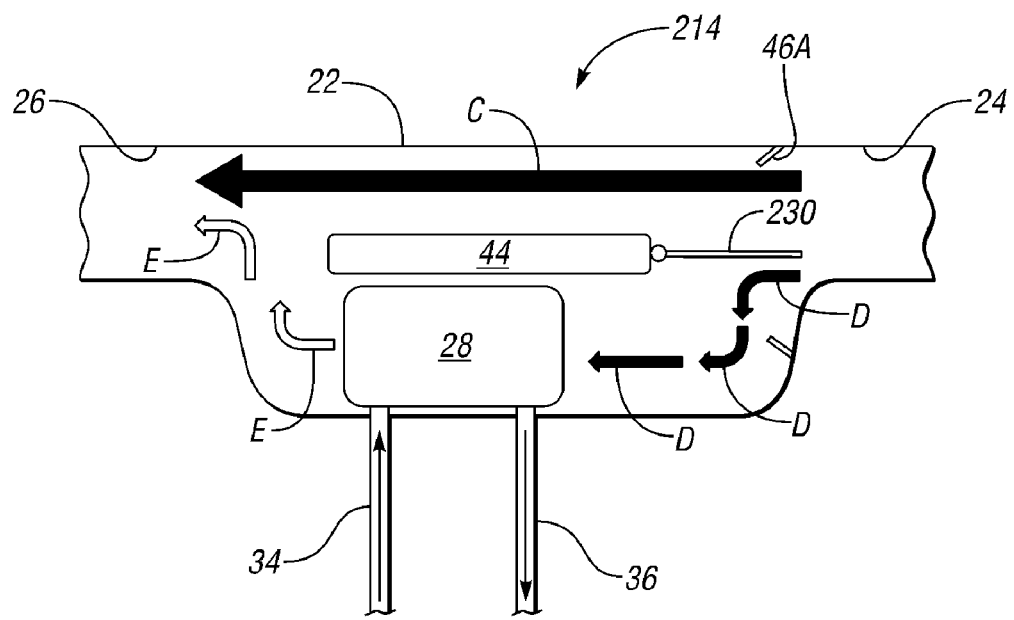
FIG. 9 is a schematic illustration of the apparatus of FIG. 8 in a second coolant heating mode.
Figure 10:
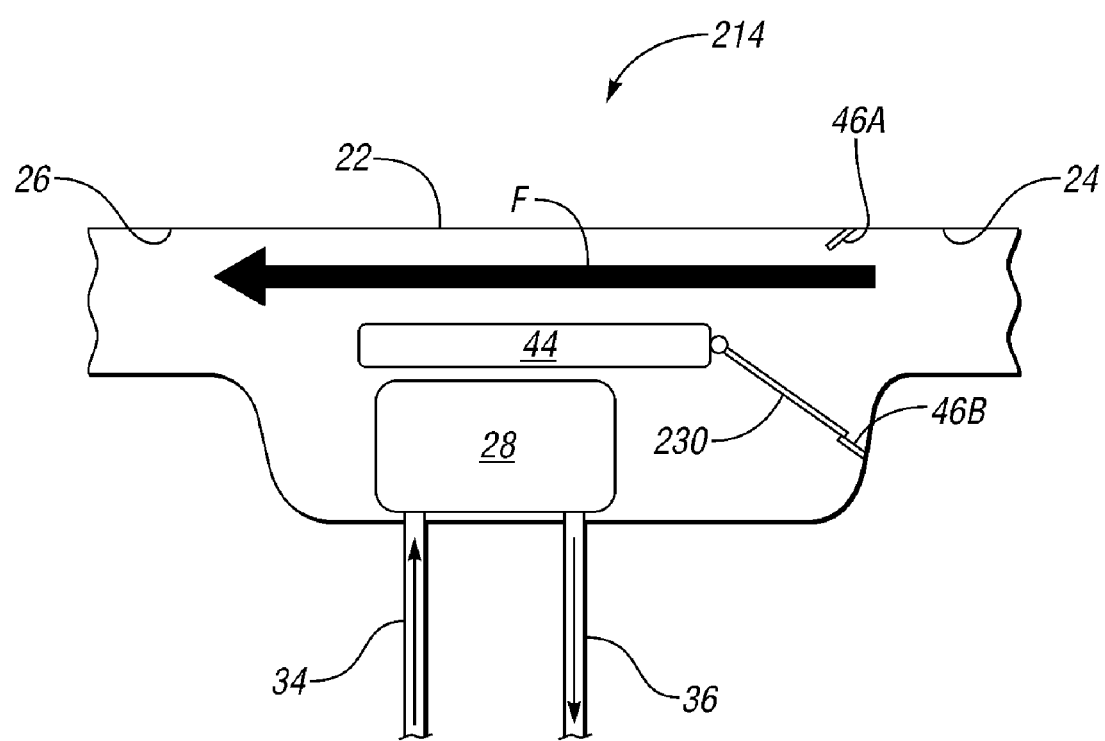
FIG. 10 is a schematic illustration of the apparatus of FIGS. 8 and 9 in a bypass mode.

Referring to FIGS. 8-10, as an alternative to apparatus 14, another embodiment of an apparatus 214 operatively connectable to the engine 12 is operable to accomplish exhaust heat recovery with multiple coolant heating modes. Components of the apparatus 214 that are the same as those of apparatus 14 are referred to using like reference numbers. The apparatus 214 include a bypass valve 230 operatively connectable to controller 40 of FIG. 1 to establish two coolant heating modes and a bypass mode. The valve 230 does not have two separate portions like valve 30, yet still provides variable coolant heating modes. The controller 40 may control the valve 230 with pulse width modulation. Additionally, an additional sensor 33E is provided to determine valve position. The sensor 33E may be a position, a temperature, or a pressure sensor, with the valve position calculated by the controller based on the information provided by the sensor 33E according to a stored algorithm.

Referring to FIG. 8, when the valve 230 is in a first position of first mode as shown, flow on one side of the wall 44 is blocked, and therefore all exhaust flow is directed through the heat exchanger 28 along a first flow path in a first coolant heating mode, as indicated by flow arrows A showing exhaust gas entering the heat exchanger 28, and flow arrows B indicating exhaust gas exiting the heat exchanger 28. The first mode is established by the controller 40 as described with respect to FIG. 2A. Some heat is transferred from the exhaust gas to the engine coolant via the heat exchanger 28, so that coolant in flow passage 36 is warmer than coolant in flow passage 34.

When the engine 12 is sufficiently warmed so that the coolant temperature sensor 33A indicates that coolant flowing through the engine 12 is above a first predetermined temperature, the controller 40 will control the valve 230 to operate in a second mode, as shown in FIG. 9, according to the same sensor information and control algorithm as described with respect to FIG. 3, except that the controller 40 sends a signal so that an actuator (not shown) holds the valve 230 at the intermediate position shown in which the flow path indicated by arrows A in FIG. 8 is partially blocked. Because a larger flow opening is available between the valve 230 and the wall of the pipe 22 (shown as the uppermost wall in the view of FIG. 9), the majority of exhaust gas flow is directed to the exhaust gas outlet 26 along an opposite side of wall 44 from the heat exchanger 28 than when the valve 230 is in the first position, as indicated by flow arrow C. A smaller flow opening is available from the exhaust inlet 24 to the heat exchanger 28, so a small portion of the exhaust gas flows through the heat exchanger 28, as indicated by arrows D indicating exhaust flow into the heat exchanger 28, and arrows E indicating exhaust flow out of the heat exchanger, the exhaust flowing across the heat exchanger being cooled so that exhaust at flow arrows D is warmer than exhaust at flow arrows E. Thus, flow through the heat exchanger 28 in the second coolant heating mode is restricted with respect to the first coolant heating mode. The arrows D, E and C indicate the second flow path of the second coolant heating mode. Some heat is extracted from the exhaust gas and transferred to the engine coolant in flow passage 36; however, warming of the coolant is at a lower rate in comparison to the first coolant heating mode, because only a portion of the exhaust gas is routed through the heat exchanger 28 in the second coolant heating mode. Warming at a lower rate enables additional exhaust heat recovery without resulting in boiling of the coolant exiting the heat exchanger 28.

Referring to FIG. 10, when the coolant temperature sensor 33A indicates that the temperature of coolant flowing through the engine 12 is greater than a second predetermined temperature, or when the estimated increased coolant temperature based on information from the sensors 33A, 33B, 33C, 33D, 33E is greater than the second predetermined temperature, then the controller 40 moves the valve 230 to a third position (i.e., to operate in a third mode) at the stop 46B. Thus, all exhaust flow is directed on the opposite side of wall 44 from the heat exchanger 28 along a third flow path, as indicated by flow arrow F, bypassing the heat exchanger 28 in a bypass mode.

Figure 11:
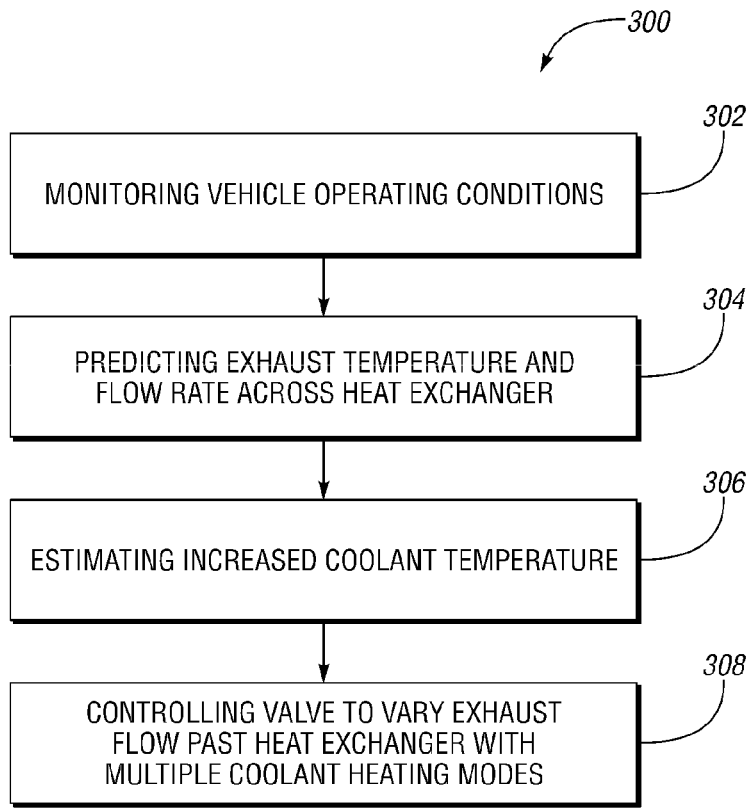
FIG. 11 is a flowchart of a method of managing exhaust heat recovery that may be carried out via any of the apparatuses of FIGS. 1-10.

Accordingly, any of the apparatuses of FIGS. 2A-10 allow the controller to command multiple coolant heating modes to increase vehicle efficiency according to a stored algorithm. Specifically, the controller 40 carries out a method 300 of managing exhaust heat recovery on a vehicle as set forth in the flow diagram of FIG. 11. The method 300 includes step 302, monitoring vehicle operating conditions including coolant temperature, engine load, engine speed and air/fuel ratio, such as described above using sensors 33A-33D operatively connected to the controller 40. The method then includes step 304, predicting exhaust temperature and exhaust flow rate across the heat exchanger 28, assuming the bypass valve 30 or 230 is fully opened (in the first mode) based on the monitored vehicle operating conditions. Under step 306, the controller 40 then estimates an increased coolant temperature due to exhaust flow at the predicted exhaust temperature and flow rate across the heat exchanger 28 according to a stored algorithm. Under step 308, the bypass valve (30 or 230) is then controlled to either the first coolant heating mode, or the second coolant heating mode to vary exhaust flow past the heat exchanger 28 based on the estimated increased coolant temperature. Additionally, the bypass valve 30 or 230 may be controlled to the bypass mode if the estimated increased coolant temperature is above a second predetermined temperature in order to prevent boiling of the coolant in coolant flow passage 36. Thus, the valve 30 or 230 is controlled to establish at least two different coolant heating modes in which exhaust flows across the heat exchanger 28 via different flow paths, and to establish a bypass mode in which substantially no exhaust flows across the heat exchanger 28.

Specifically, according to the method 300, exhaust gas is directed across the heat exchanger 28 along a first flow path to transfer exhaust heat to the coolant flow passages 36 in the first coolant heating mode when the estimated increased coolant temperature is less than or equal to a first predetermined temperature. At least a portion of the exhaust gas is directed across the heat exchanger 28 along a second flow path to transfer exhaust heat to the coolant flow passages 36 in the second coolant heating mode when the estimated increased coolant temperature is greater than the first predetermined temperature and less than a second predetermined temperature. The second flow path is restricted relative to the first flow path in that either the entrance to the heat exchanger 28 is reduced or the portion of the heat exchanger 28 across or through which exhaust gas flows is reduced in comparison to the first coolant heating mode. The exhaust gas bypasses the heat exchanger 28 in the bypass mode during which no significant coolant heating occurs via the heat exchanger 28 when the estimated increased coolant temperature is greater than the second predetermined temperature.

While the best modes for carrying out the invention have been described in detail, those familiar with the art to which this invention relates will recognize various alternative designs and embodiments for practicing the invention within the scope of the appended claims.

The invention claimed is:

1. An apparatus for a vehicle with an engine comprising:
   an exhaust system through which exhaust gas is discharged from the engine;
   a heat exchanger positioned at least partially within the exhaust system;
   coolant flow passages in thermal communication with the engine and with the heat exchanger;
   a bypass valve operable to direct the exhaust gas across the heat exchanger along a first flow path to transfer exhaust heat to the coolant flow passages in a first coolant heating mode; operable to direct at least a portion of the exhaust gas across the heat exchanger along a second flow path to transfer exhaust heat to the coolant flow passages in a second coolant heating mode; wherein the second flow path is restricted relative to the first flow path; and operable to direct the exhaust gas to bypass the heat exchanger in a bypass mode during which no significant coolant heating occurs via the heat exchanger;
   wherein the bypass valve has a first portion and a second portion movable independently from one another; wherein the first portion is in a first position and the second portion is in a second position in the second coolant heating mode such that the second portion partially blocks flow to the heat exchanger to establish the second flow path; and
   a barrier extending from the heat exchanger and arranged so that the second portion of the bypass valve contacts the barrier in the second coolant heating mode to direct exhaust gas between the bypass valve and the heat exchanger such that exhaust gas flows over only a portion of the heat exchanger and is blocked from a remaining portion of the heat exchanger by the barrier and the second portion of the bypass valve.

2. The apparatus of claim 1, further comprising:
   at least one sensor operable to sense vehicle operating conditions;
   a controller operatively connected to the at least one sensor and to the bypass valve and operable to move the bypass valve to establish the first coolant heating mode when the at least one sensor senses a first set of vehicle operating conditions, to move the bypass valve to establish the second coolant heating mode when the at least one sensor senses a second set of vehicle operating conditions, and to move the bypass valve to establish the bypass mode when the at least one sensor senses a third set of vehicle operating conditions.

3. The apparatus of claim 2, wherein the at least one sensor includes a coolant temperature sensor; wherein the first set of vehicle operating conditions includes coolant temperature less than a first predetermined temperature; wherein the second set of vehicle operating conditions includes coolant temperature greater than the first predetermined temperature and less than a second predetermined temperature; and wherein the third set of vehicle operating conditions includes coolant temperature greater than the second predetermined temperature.

4. The apparatus of claim 3, wherein the at least one sensor further includes a sensor operable to sense engine loading; wherein the second set of vehicle operating conditions includes engine loading less than a predetermined engine load.

5. An apparatus for a vehicle with an engine comprising:
   an exhaust system through which exhaust gas is discharged from the engine;
   a heat exchanger positioned within the exhaust system;
   coolant flow passages in thermal communication with the engine and with the heat exchanger;
   a bypass valve operable to establish at least two different coolant heating modes in which exhaust gas is directed across the heat exchanger to transfer heat to coolant in the coolant flow passages, wherein the two different coolant heating modes are characterized by different flow paths in which exhaust flow is directed across different portions of the heat exchanger; wherein the bypass valve is further operable to establish a bypass mode during which the exhaust gas bypasses the heat exchanger so that no significant coolant heating occurs via the heat exchanger; and
   wherein the bypass valve has a first portion and a second portion movable independently from one another; wherein both of the first and second portions are in a first position in a first of the coolant heating modes and in a second position in the bypass mode; and wherein the first portion is in the first position and the second portion is in the second position in a second of the coolant heating modes such that the second portion partially blocks flow to the heat exchanger.

6. The apparatus of claim 5, further comprising:
a barrier arranged to direct exhaust gas between the bypass valve and the heat exchanger such that exhaust gas flows over only a portion of the heat exchanger in the second of the coolant heating modes.

7. The apparatus of claim 5, further comprising:
at least one sensor operable to sense vehicle operating conditions;
a controller operatively connected to the at least one sensor and to the bypass valve and operable to activate an actuator to move the bypass valve to establish the first of the coolant heating modes when the at least one sensor senses a first set of vehicle operating conditions,
move the bypass valve to establish the second of the coolant heating modes when the at least one sensor senses a second set of vehicle operating conditions, and
move the bypass valve to establish the bypass mode when the at least one sensor senses a third set of vehicle operating conditions.

8. The apparatus of claim 7, wherein the at least one sensor includes a coolant temperature sensor; wherein the first set of vehicle operating conditions includes coolant temperature less than a first predetermined temperature; wherein the second set of vehicle operating conditions includes coolant temperature greater than the first predetermined temperature and less than a second predetermined temperature; and wherein the third set of vehicle operating conditions includes coolant temperature greater than the second predetermined temperature.

9. The apparatus of claim 7, wherein the at least one sensor further includes a sensor operable to sense one of said vehicle operating conditions corresponding with engine loading; wherein the second set of vehicle operating conditions includes engine loading less than a predetermined engine load.

* * * * *